United States Patent Office 3,419,160
Patented Dec. 31, 1968

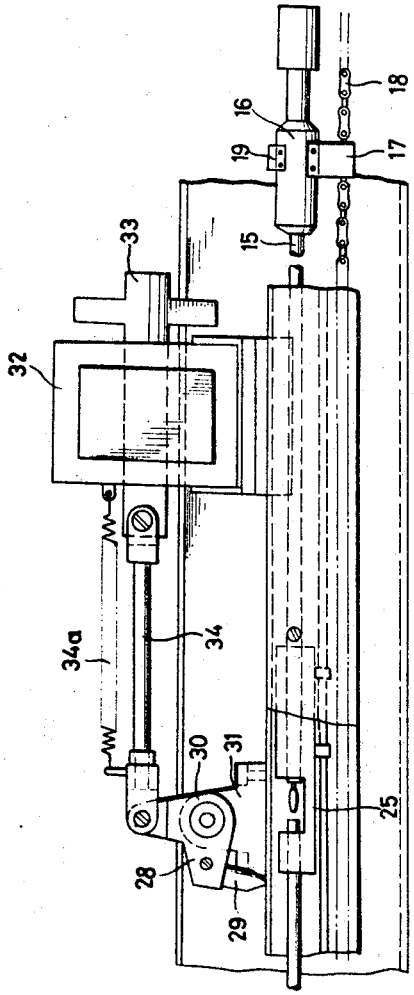

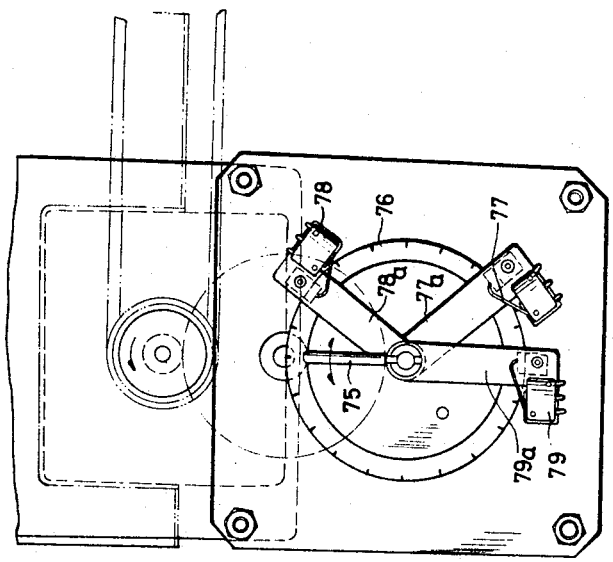
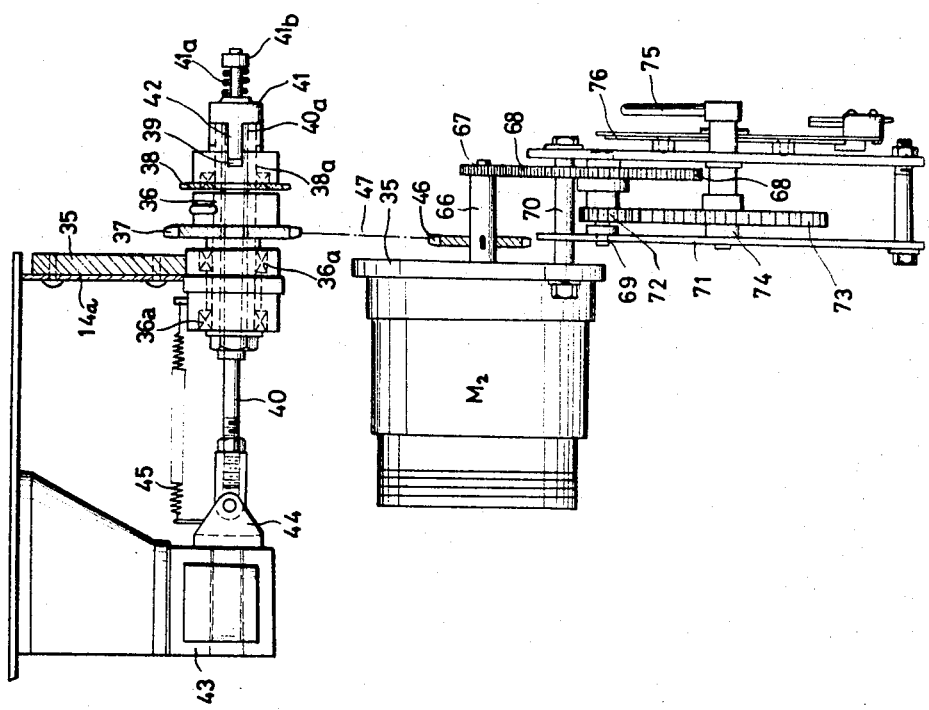

3,419,160
BAR FEEDING APPARATUS FOR AN
AUTOMATIC LATHE
Shiro Azuma, 615 Josuiminamicho, Kodaira,
Tokyo, Japan
Filed July 17, 1967, Ser. No. 653,817
10 Claims. (Cl. 214—1.2)

ABSTRACT OF THE DISCLOSURE

Bar feeding apparatus for feeding bar material, one by one, to an automatic lathe, by the aid of a pusher rod or feed bar which may be provided at its leading end with a frictionally engaging head adapted to fit into a recessed hole in the tail end of the bar material. A bar supporting block and bar stopping mechanism are provided to cooperate in advancing the pusher rod until one bar is frictionally interconnected therewith, returning the stopping mechanism to its inoperative position to allow the pusher rod to advance the one bar for machining in the lathe, re-activating the stopping mechanism to force the scrap end of the one bar against the supporting block, temporarily holding the scrap end until further return movement of the pusher rod, and forcibly disconnecting the pusher rod from the scrap end of the one bar, which can then be discarded. The procedural steps are repeated during continuous operation of the automatic lathe.

---

This invention relates generally to a bar feeding apparatus for an automatic lathe, and more particularly to improved means for automatically feeding bar material, one after the other, by means of a pusher-rod mechanism.

It is commonly known with conventional bar feeding apparatus for such lathes to use a pusher rod to transfer bar material to a machining position. After the machining, the pusher rod makes a return movement, holding the scrap end of the machined bar, which is eventually disconnected from the pusher rod. For this purpose, in hitherto known devices, the rear end of the bar material is embraced by the end of the pusher rod; this however does not result in a safe connection and/or disconnection between the bar and the pusher rod.

An object of the present invention is to provide means to avoid the above-described imperfections, and a bar feeding apparatus which is reliable in operation, can be attached to various types of automatic lathes, and is economically manufactured and maintained.

The prior art has another disadvantage in that the machinable diameter of the bar material is limited so that it has to be much smaller than that of the spindle of the automatic lathe. It is, therefore, another object of the invention to provide improved means to overcome this additional disadvantage of prior-art devices.

It is one of the important features of the invention that the bar feeding apparatus comprises a bar stopping mechanism cooperating with a pusher rod or feed bar and a bar supporting block. The stopping mechanism holds the bar material by forcibly pressing it down against the supporting block, the pusher block being further advanced to forcibly connect itself with the bar material, the stopping mechanism being then returned to its inoperative position to allow the pusher rod to advance the bar for further machining.

When the pusher rod makes its return movement together with the scrap end of the bar, the stopping mechanism is again actuated to hold the scrap end until further return motion of the pusher rod which then forcibly disconnects itself from the scrap end of the bar.

It is another important feature of the invention that the feeding apparatus comprises means to overcome the above-mentioned diameter limitation. This is accomplished by providing a recessed hole on the rear end of the bar material, and a male engaging head on the leading end of the pusher rod, suitably shaped to connect with and/or disconnect from a recessed hole provided in the tail end of the bar material.

Additional features of the inventive bar feeding apparatus relate to bar pick-up discs rotatable within respective guide rings, for feeding the bar material one by one into a feed guide from where the advancing movement is initiated by the pusher rod proper.

The invention provides various switch means for correlating the operations of the apparatus with those of the associated automatic lathe. These are preferably microswitches, adjustably supported on a calibrated disc so as to control consecutive operational phases.

Other important features of the invention relate to a pivotable bell crank and jaw means attached thereto, as well as means for urging the jaw in frictional engagement with the rod to be advanced into the lathe. Furthermore, a collar may be fixed to the pusher rod, there being a connecting segment rigid with the collar, and a chain being guided for advancing and withdrawing the pusher rod. Finally, it should be noted that drive means are provided for operating the bar pick-up discs and the chain, further including clutch means for optionally coupling the operation of various means as the bar feeding apparatus is actuated. Gravitational drive means may be provided for advancing the pusher rod upon disengagement of the clutch means.

The various objects, features and attendant advantages of the present invention will become more apparent from the following description of a preferred exemplary embodiment of the bar feeding apparatus, when considered in conjunction with the accompanying drawings, wherein FIG. 1 is an overall side view of an exemplary embodiment of the inventive bar feeding apparatus for an automatic lathe (not shown);

FIG. 4 is a partial side view, on an enlarged scale, illustrating the components for engaging and/or disengaging a pusher rod with the bar material;

FIG. 5 is an enlarged side view showing an engaging head on the leading end of the pusher rod;

FIG. 6 is a side view, on an enlarged scale, of a driving mechanism also shown in FIG. 2, as well as a motor-control mechanism; and FIG. 7 is a partial view of the control mechanism, as viewed from the right-hand side of FIG. 6.

Figure 1:
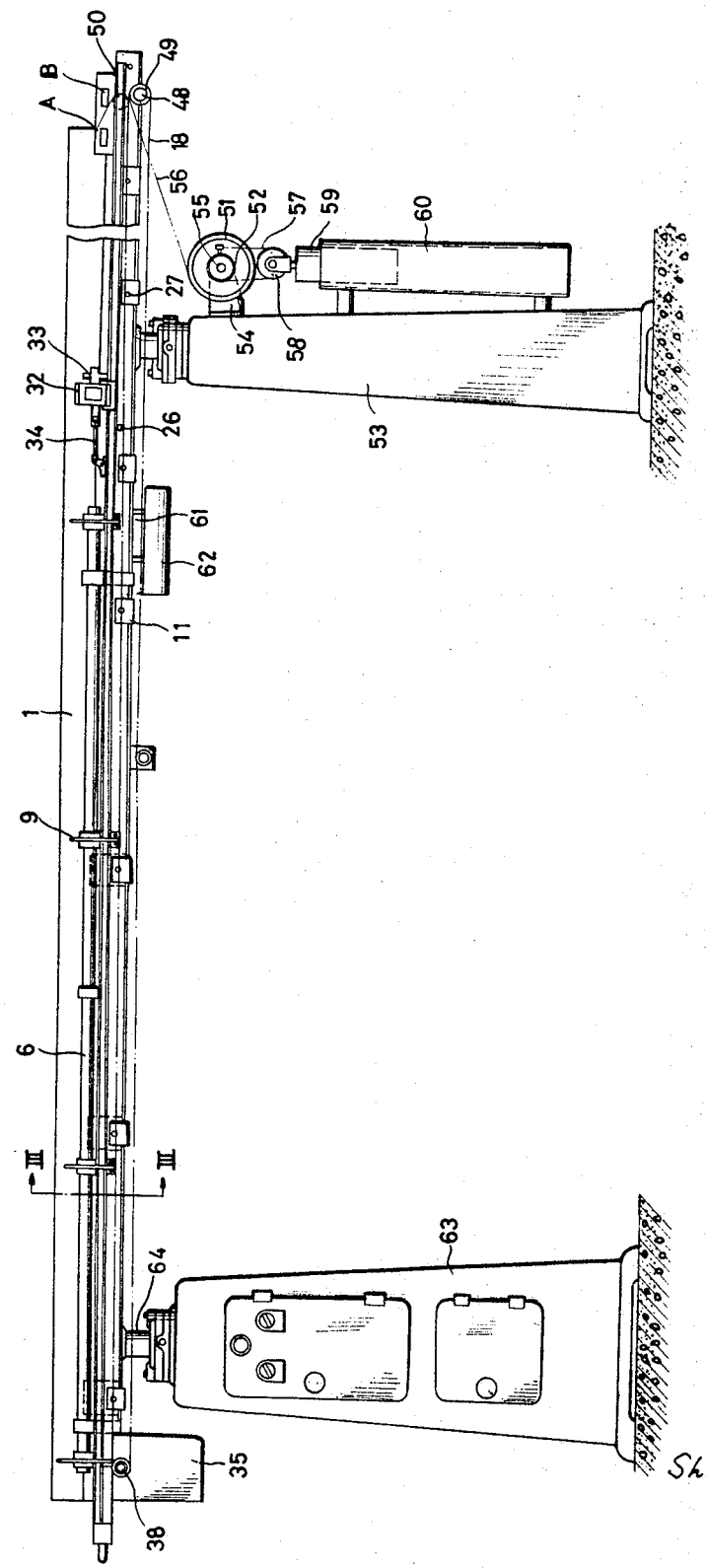
Figure 2:
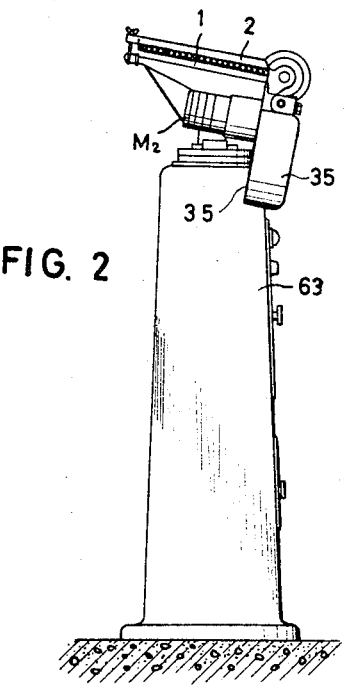
FIG. 2 is an end view of the apparatus, as shown in FIG. 1.
Figure 3:
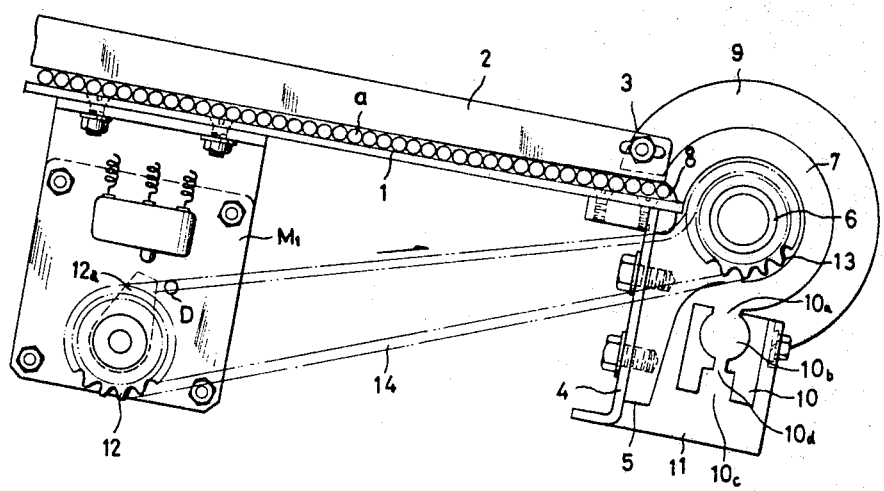
FIG. 3 is a partial view, taken along line III—III of FIG. 1, in the direction of FIG. 2.

Referring initially to FIGS. 1 to 3, and particularly to the enlarged view of FIG. 3, numeral 1 indicates an inclined magazine plate which supports the bar material *a* on its surface. A plate 2 keeps the material in a single layer. A bolt 3 adjustably and removably holds the plate 2. A plate 4 is attached to the magazine plate 1 at its one end, substantially at right angles, and depending therefrom, as shown in FIG. 3. Numeral 5 denotes at least two arms to hold bearings mounted on the plate 4. A shaft 6 is rotatably supported by the bearing arms 5 in a position near to the delivery end of the magazine plate 1 (at the right-hand side of FIG. 3), parallel to the bar material. Four of the structures shown in FIG. 3 are illustrated, as a matter of example, in FIG. 1 but it will be understood that for relatively short bar material, two arms 5 and associated structures might also prove sufficient. An equal number of bar pick-up discs 7 is fixed to the shaft 6, which can be exchanged and replaced according to the diameter of the bar material to be fed into the lathe. A recess 8 is provided at one location along the circumference of each disc 7, suitably shaped to engage a single bar $a$. A guide ring 9 is fixed with a small clearance to disc 7 to hold the bar material between them.

A feed guide 10 extends over substantially the entire length of the magazine plate 1, beneath the shaft 6, parallel therewith, and being fixed to the plate 4 by a fitting structure 11. FIG. 3 also shows a center hole 10b through the feed guide 10, with an opening 10a on its upper side to receive the bar material. Numeral 10c denotes a space provided for a chain 18 to pass through, which will be described later in more detail. An opening 10d is provided in the feed guide 10 for a connecting segment 17 travelling along the guide 10 (see FIG. 4). $M_1$ is a reduction speed motor mounted beneath the magazine plate 1. A sprocket wheel 12 is fixed to the shaft of motor $M_1$ while a sprocket wheel 13 is fixed to the shaft 6. A chain 14 interconnects the sprockets 12, 13. A cam 12a is secured to the motor shaft. At D a microswitch is schematically shown, to be actuated by the cam 12a, to operate the circuit of the motor $M_1$ and that of another motor, identified as $M_2$, to be described later, once every revolution of motor $M_1$.

Referring now to FIGS. 4 and 5, a pusher rod or feed bar 15 is shown, inserted into and passing through the hole 10b in the feed guide 10. A collar 16 is fixed to the rear end of the pusher rod 15. A connecting segment 17, having its upper portion connected to the collar 16, is driven back and forth by the afore-mentioned chain 18, carrying the pusher rod 15. A projection 19 is fixed to the collar 16 to actuate microswitches A, B, also to be described later.

An engaging head 20 is rotatably mounted on the leading end of the pusher rod 15 (see FIG. 5), by way of a tubular end portion 15a of the pusher rod. Steel balls 21 and a pin 22 are interposed. A head portion 20a of the engaging head 20 is suitably shaped to engage a recessed hole $p$ in the rear end of the bar material $a$, wherein a knock-pin 23 is used to fix the engaging head 20 to the pin 22. At least one bow spring 24 is mounted in a slot disposed on the upper surface of the pusher rod 15, with its one end being fixed to the rod.

FIG. 4 shows a supporting block 25, slidably mounted in the center hole 10b of the feed guide 10, and including a U-shaped front portion, a tubular rear portion and a center portion provided with an opening, substantially as shown. This supporting block 25, having its rear portion in touch with the bow spring or springs 24, moves back and forth, together with the pusher rod 15. Respective front and rear stops 26 and 27 are disposed (see FIG. 1) to limit the movement of the block 25. A bell crank 28 is shown in FIG. 4, and 29 denotes a jaw mounted on one end of the bell crank 28. A shaft 30 pivotally holds the bell crank 28, and is supported by a member 31 mounted on the upper surface of the feed guide 10.

A solenoid 32 is provided to actuate the bell crank 28 and the jaw 29 therewith. A core or armature 33 is inserted in the solenoid 32. A rod 34 connects the armature 33 with the bell crank 28. A coil spring 34a is preferably provided to return the bell crank 28 to its inoperative position, with the jaw 29 turned in clockwise direction, as viewed in FIG. 4.

The mechanism for reciprocating the pusher rod 15 is shown in FIGS. 1, 2 and 6. Referring to FIG. 6, a plate 35 is fixed to a side plate 14a which is in turn attached to the magazine plate 1. A hollow shaft 36 is rotatably supported by the plate 35, by the way of ball bearings 36a, for a sprocket wheel 37 fixed thereto. Another sprocket wheel 38 is rotatably carried by the shaft 36. Clutch slots 39 are disposed on a hub 38a of the sprocket 38.

An engaging shaft 40 is slidably mounted in the hollow shaft 36 and has a shoulder 40a. A clutch disc 41 is rotatably carried by the shaft 40. A coil spring 41a is provided to urge the disc 41 toward the sprocket hub 38a. A seat 41b is provided for the spring 41a, located at the end of the engaging shaft 40. Clutch projections 42 are disposed on clutch 41 to engage with the slots 39.

A solenoid 43 serves to disengage the clutch and is suspended from the magazine plate 1. Solenoid 43 has a core or armature 44 while a coil spring 45 is provided to return the shaft 40 toward the right-hand side, as viewed in FIG. 6.

Motor $M_2$, mentioned before, is a reduction speed motor mounted on the plate 35 (for the sake of clarity, the support means and portions of the plate have been omitted from this view). A sprocket 46 is fixed onto the rotating shaft of motor $M_2$. A chain 47, only schematically shown, interconnects the driving sprocket 46 with the driven sprocket 37 mentioned before.

Referring again to FIGS. 1 and 2, a sprocket-wheel shaft 48 is rotatably mounted on the feed guide 10 at its lower rear end. A rear sprocket wheel 49 is fixed on the shaft 48. The chain 18 interconnects the sprocket wheels 38 and 49 (see FIG. 1). A reel drum 50 is fixed to the shaft 48. Pulleys 51, 52 of larger and smaller diameters, respectively, are disposed on a shaft 55 which is rotatably mounted on an arm 54 projecting from a supporting frame portion 53. A wire, chain or the like member 56 is wound around the reel drum 50, at its one end, and on the larger pulley 51, on the other. Another wire, identified with numeral 57, is fixed to the arm 54, at its one end, and is wound on the smaller pulley 52, with the other end, and another small pulley 58 is suspended on the wire 57.

A weight 59, preferably of a cylindrical shape, hangs down from the shaft of pulley 58. A guide tube 60 is supported from the frame portion 53, for the weight 59. FIG. 1 also shows an opening 61 provided for the scrap ends of the bars, remaining after machining, to drop therethrough. Numeral 62 denotes a bucket to receive the discarded pieces of scrap ends.

Another supporting frame portion, 63, preferably has a control panel attached thereto, although this may of caurse be located elsewhere. A support 64 is carried by the frame portion 63 for the magazine plate 1. The aforementioned microswitches A, B are disposed and wired to open and close the circuit of the solenoid 32. As has been mentioned before, these microswitches are actuated by the projection 19 on the pusher rod 15 in such a way that each of them cooperates either to open or to close the circuit according to the direction of movement of the projection 19, be it forward or backward, in the direction of movement of the bar material and the mechanism associated therewith.

Referring again to FIGS. 6 and 7, the abovementioned motor $M_2$ has a shaft 62 to which a gear 67 is fixed. A reduction gear 68, attached to a shaft 69, is adapted to engage the gear 67. Shaft 69 is rotatably supported by a side plate fitting 71 held, for example, by a bolt or the like member 70, the plate fitting 71 being fixed to the shaft 69. A reduction gear 73 is also mounted in the fitting 71, to engage a gear 72 also carried by the shaft 69, the shaft 74 being rotatably supported by the fitting 71. A contactor arm 75 is fixed at the end of shaft 74. A stationary plate fitting 76 carries microswitches 77, 78 and 79, and is appropriately dial-graduated.

The microswitches 77–79 are supported on the periphery of the fitting 76 by the way of respective arms 77a, 78a and 79a, and serve for stopping the motor $M_2$ and starting the motor $M_1$, respectively. The microswitch 78 serves for switching over the motive power, as will be explained later, the switches 78 and 79 being in cooperation with the chuck of the automatic lathe and its control circuit. The microswitches 77–79 can be adjustably secured to desired locations on the dial fitting 76, and another graduation may be provided on its fitting to show the progress of machining, in addition to controlling the operation of the microswitches.

It should be added that the engaging head 20a, shown in FIG. 5, is appropriately shaped so as to give an effective frictional fit with the recessed hole p in the rear end of the bar material a, enabling the head 20a to be forced into yet be removed from the latter.

It is to be noted that alternate means may be used to achieve the same purpose by having, instead of the engaging head portion 20a, two or more elastic arms (not illustrated), appropriately disposed at the end of the engaging head 20, to give the above-mentioned effective frictional fit.

In the following, further features of the inventive bar feeding apparatus will be described, together with its operational phases. The inclined magazine plate 1 (FIGS. 1 to 3) carries a plurality of bars a in a single layer on its surface, the lowermost bar being engaged by the recesses 8 under the influence of gravity. When the motor $M_1$ is started, the discs 7 in each of the plural structures start to rotate inside of the respective stationary guide rings 9, carrying a single bar in the recesses 8, and when the latter reach the lowermost position, the bar drops through the openings 10a into the holes 10b of the feed guide 10, and is then placed on the supporting block 25. After the discs 7 have completed one revolution, the cam 12a actuates the mircoswitch D to open the motor circuit $M_1$ to stop the same. The next bar is then fed into the recesses 8 while at the same time another circuit is closed by the action of the microswitch D to start the motor $M_2$.

The rotation of the motor $M_2$ shaft 66 is transmitted to the sprocket wheel 38 by way of sprocket 46, chain 47 and driven sprocket 37. The chain 18, linking the sprockets 38 and 49, in turn moves forward the pusher rod 15 through the connecting segment 17. When the engaging head 20 at the leading end of the pusher rod 15 approaches the rear end of the bar material a, the projection 19 on the collar 16 at the rear end of the pusher rod 15 actuates the microswitch B and, in turn, the solenoid 32. The jaw 29 now forcibly presses the bar material a against the supporting block 25. The bar is thus kept stationary, having its axis in alignment with that of the pusher rod 15 and accordingly with the engaging head 20 so that the latter can be forced into the recess p at the rear end of the bar (see FIG. 5). When this forced connection is completed, the microswitch A is actuated by the projection 19, and the solenoid 32 is returned to its inoperative position, the jaw 29 being then returned by means of the coil spring 34a, releasing the bar a.

In the meantime, when the pusher rod 15 enters the rear tubular portion of the supporting blocks 25, the bow spring or springs 24 thereof come in contact with the block 25 and moves it forward, this movement being however arrested by the stop 26, and thereafter the pusher rod 15 proceeds by itself. When the leading end of the bar material, entrained by the rod 15, reaches the main spindle of the automatic lathe (not shown), and approaches a stop disposed in the lathe, and passing through a guide bushing of the chuck, the contactor arm 75 actuates the microswitch 78 to close the circuit of solenoid 43. This in turn moves the engaging shaft 40 to the left, as viewed in FIG. 6, thereby disengaging the clutch projections 42 from the clutch slots 39, resulting in disengagement between the sprocket wheels 37, 38.

When this is accomplished, the weight 59 (see FIG. 1) will rotate the smaller pulley 52, and the wire 56 is reeled onto the larger pulley 51 from the reel drum 50 which in turn rotates the rear sprocket wheel 49. It will thus be seen that after disengagement of the sprocket shaft 36 from the sprocket wheel 38, the pusher rod 15 is moved forward by the weight 59. By means of the microswitch 78, another solenoid circuit of the lathe is opened, to allow the chuck to close by action of a return spring or the like expedient, so that the automatic lathe starts its machining operation.

The machining proceeds and when the engaging head 20 at the end of the pusher rod 15 reaches a point just adjacent or before the chuck in the lathe, the contactor arm 75 will actuate the microswitch 79 which in turn opens the chuck and stops the machining operation, while at the same time the motor $M_2$ is made to start to rotate in the reverse direction. The solenoid 43 then opens its circuit and by means of the return coil spring 45, the clutch projections 42 re-engage the clutch slots 39, and the pusher rod 15 then starts its return movement holding the scrap end of the machined bar material while the wire 56 is wound onto the reel drum 50.

The pusher rod 15 is in contact with the supporting block 25 via the bow springs 24 and moves the same backwards. However, the return motion of the supporting block is arrested by the stop 27 while the rod 15 alone continues its return motion. When the scrap end of the bar material comes beneath the jaw 29, the projection 19 on the collar 16, mounted on the rear end of the pusher rod 15, actuates the microswitch A and in turn the solenoid 32. This results in that the jaw 29 forcibly presses down the scrap end of the bar material onto the block 25, allowing the same to disengage with the rod 15 which further continues its return motion.

The projection 19 then actuates the microswitch B, and the solenoid 32 opens its circuit, allowing the jaw 29 to return to its inoperative position by means of the coil spring 34a, the scrap end of the machined bar being then dropped into the bucket 62 through the opening 61. The pusher rod 15 further continues its return motion until the contactor arm 75 actuates the microswitch 77, to stop the motor $M_2$ and also the return motion of the rod 15. At the same time the motor $M_1$ is started and the next bar is transferred to the guide 10 and dropped through the openings 10a, thus repeating the described operation.

In view of the foregoing, by the present invention, the connection and/or disconnection of the pusher rod and the bar material can easily be achieved without fail, avoiding in turn the possibility of interruption of the operation of the associated automatic lathe due to misoperation of the feeding of the bar material. It is also made possible to machine a bar material with an outer diameter substantially equal to that of the spindle of the automatic lathe.

The foregoing disclosure relates only to a preferred exemplary embodiment of the bar feeding apparatus, which is intended to include all changes and modifications of the example described, within the scope of the invention as set forth in the appended claims.

It will be understood by those skilled in the art that the described supporting block does not have to be necessarily movable together with the pusher rod of the inventive bar feeding apparatus but that an alternative embodiment is possible to keep the supporting block stationary.

In the above-described embodiment, a microswitch is provided to switch over the motor drive to gravity operation by a weight, shortly before the machining operation on the automatic lathe, in order to have a constant force for feeding the bar material; however, it is also possible to eliminate the switching mechanism by using a servomotor or other conventional control means.

What I claim is:

1. A bar feeding apparatus for an automatic lathe, comprising, in combination: storage means for a plurality of bar materials; a bar stopping mechanism, including a reciprocable pusher rod and an associated slidable bar supporting block; operating means, including means for immobilizing one bar, upon temporary operation of said stopping mechanism, by forcing one bar against said supporting block; means for advancing movement of said pusher rod until the one bar is frictionally interconnected therewith; means for returning said stopping mechanism to its inoperative position to allow said pusher rod to advance the one bar for machining the same in the lathe; means for re-activating said stopping mechanism, when said pusher rod moves back together with the scrap end of the one bar, left over after machining, to force the scrap end against said supporting block; means for temporarily holding the scrap end at said supporting block until further return movement of said pusher rod; and means for forcibly disconnecting said pusher rod from the scrap end for discarding the latter.

2. The bar feeding apparatus as defined in claim 1, wherein said pusher rod includes an engaging head at the leading end thereof, having at least one portion adapted for frictional engagement with a recessed hole provided in the tail ends of the bar materials.

3. The bar feeding apparatus as defined in claim 1, wherein said storage means includes at least two spaced-apart guide rings for the bar materials, a replaceable bar pick-up disc within each guide ring and having a recess adapted to receive one bar of a particular maximum diameter, and means for rotating said discs for feeding the bar materials one by one into a feed guide substantially parallel with said pusher rod.

4. The bar feeding apparatus as defined in claim 3, further comprising at least one switch means periodically acted upon by said rotating means, for selectively closing and opening at least one control circuit for the various operating means.

5. The bar feeding apparatus as defined in claim 1, wherein said supporting block has a tubular portion through which said pusher rod passes during its movement, the latter having at least one longitudinal slot therein, and spring means fitted in each slot, for frictional engagement with said tubular portion of the supporting block.

6. The bar feeding apparatus as defined in claim 1, wherein said immobilizing and said holding means include a pivotable bell crank and jaw means attached thereto, means for urging said jaw means in frictional engagement with the one rod and against said supporting block, and biasing means for moving said jaw out of engagement with the one rod upon de-activation of said urging means.

7. The bar feeding apparatus as defined in claim 1, wherein said advancing means includes a collar fixed to said pusher rod, a connecting segment rigid with said collar, a chain guided substantially parallel with the direction of advancing movement of the one rod and engaged by said segment, and means for moving said chain in either direction for selective advancing and return movement of said pusher rod.

8. The bar feeding apparatus as defined in claim 7, further comprising at least one switch means operatively connected with said moving means, settable to various consecutive operational phases, for selectively closing and opening at least one control circuit for the various operating means and for the operation of the lathe.

9. The bar feeding apparatus as defined in claim 8, further comprising releasable clutch means associated with said moving means for optionally coupling the movements of said chain with the operation of said switch means.

10. The bar feeding apparatus as defined in claim 9, further comprising gravitational drive means for advancing said pusher rod upon disengagement of said clutch means.

References Cited

UNITED STATES PATENTS

| | | | |
|---|---|---|---|
| 3,147,653 | 9/1964 | Jones | 214—1.4 X |
| 3,360,139 | 12/1967 | Bechler | 214—1.2 |

GERALD M. FORLENZA, *Primary Examiner.*

FRANK E. WERNER, *Assistant Examiner.*

U.S. Cl. X.R.

82—2.7